(12) United States Patent
Burckhardt

(10) Patent No.: US 7,625,993 B2
(45) Date of Patent: Dec. 1, 2009

(54) POLYALDIMINES

(75) Inventor: Urs Burckhardt, Zurich (CH)

(73) Assignee: Sika Technology AG, Baar (CH)

( * ) Notice: Subject to any disclaimer, the term of this patent is extended or adjusted under 35 U.S.C. 154(b) by 93 days.

(21) Appl. No.: 10/522,138

(22) PCT Filed: Jul. 23, 2003

(86) PCT No.: PCT/EP03/08040

§ 371 (c)(1), (2), (4) Date: Aug. 24, 2005

(87) PCT Pub. No.: WO2004/013088

PCT Pub. Date: Feb. 12, 2004

(65) Prior Publication Data

US 2006/0149025 A1    Jul. 6, 2006

(30) Foreign Application Priority Data

Jul. 26, 2002    (EP)    .................. 02016729

(51) Int. Cl.
*C08G 12/04* (2006.01)
*C08G 12/00* (2006.01)
*C08G 2/00* (2006.01)

(52) U.S. Cl. ...................... 528/266; 528/230

(58) Field of Classification Search .............. 528/230, 528/266

See application file for complete search history.

(56) References Cited

U.S. PATENT DOCUMENTS

| | | | | |
|---|---|---|---|---|
| 3,264,268 A | * | 8/1966 | Muller et al. | 528/76 |
| 3,475,359 A | * | 10/1969 | Cummings | 427/386 |
| 4,059,549 A | | 11/1977 | Brinkmann et al. | |
| 4,094,914 A | * | 6/1978 | Rottig et al. | 568/862 |
| 4,191,838 A | * | 3/1980 | Merger et al. | 560/205 |
| 4,252,919 A | * | 2/1981 | Wagner et al. | 525/418 |
| 4,324,921 A | * | 4/1982 | Arpe | 568/427 |
| 4,469,831 A | * | 9/1984 | Bueltjer et al. | 524/112 |
| 4,720,535 A | | 1/1988 | Schleier et al. | |
| 4,833,230 A | * | 5/1989 | Kiely et al. | 528/230 |
| 4,853,454 A | * | 8/1989 | Merger et al. | 528/59 |
| 4,997,905 A | * | 3/1991 | Druet et al. | 528/230 |
| 5,010,161 A | * | 4/1991 | Aoki et al. | 528/59 |
| 5,032,667 A | * | 7/1991 | Harris et al. | 528/125 |
| 5,039,762 A | * | 8/1991 | Demarey | 525/509 |
| 5,087,661 A | | 2/1992 | Aoki et al. | |
| 5,374,366 A | * | 12/1994 | Nakahara et al. | 508/492 |
| 5,385,687 A | * | 1/1995 | Emert et al. | 508/239 |
| 5,457,147 A | * | 10/1995 | McGrath et al. | 524/701 |
| 5,466,771 A | * | 11/1995 | Hicks et al. | 528/64 |
| 5,488,095 A | * | 1/1996 | Boeckh et al. | 510/479 |
| 5,612,443 A | * | 3/1997 | Martino et al. | 528/229 |
| 5,800,872 A | * | 9/1998 | Katz et al. | 427/385.5 |
| 6,031,132 A | * | 2/2000 | Saeki et al. | 564/153 |
| 6,136,942 A | | 10/2000 | Pfenninger et al. | |
| 6,559,303 B1 | * | 5/2003 | Cook | 540/472 |
| 6,624,284 B1 | * | 9/2003 | Biedermann et al. | 528/230 |
| 2002/0063239 A1 | * | 5/2002 | Cameron et al. | 252/182.13 |

FOREIGN PATENT DOCUMENTS

| | | |
|---|---|---|
| EP | 0 169 702 A2 | 1/1986 |
| EP | 0 375 318 A2 | 6/1990 |
| EP | 0 469 751 A | 2/1992 |
| JP | A-61-44901 | 3/1986 |
| JP | A-2-283710 | 11/1990 |
| JP | 07025976 A * | 1/1995 |

* cited by examiner

*Primary Examiner*—Mark Eashoo
*Assistant Examiner*—Liam J Heincer
(74) *Attorney, Agent, or Firm*—Oliff & Berridge, PLC

(57) ABSTRACT

The invention relates to polyaldimines which may be obtained from at least one polyamine (A) with aliphatic primary amino groups and at least one aldehyde (B). Said polyaldimines are odorless as are the aldehydes (B) produced by hydrolysis thereof. The invention further relates to methods for production of said polyaldimines and aldehyde (B) and methods for hydrolysis of the polyaldimine. The use of said polyaldimine in compositions as adhesive, sealant, coating or covering agents is disclosed. Said polyaldimines are characterized in being odorless, rapidly hydrolyzed on contact with water, no detectable odors being generated after hydrolysis thereof and stable to storage with the exclusion of water in compositions which contain components reactive towards amines.

14 Claims, No Drawings

POLYALDIMINES

TECHNICAL FIELD AND PRIOR ART

The invention relates to innovative polyaldimines. These polyaldimines are odorless and are obtainable from polyamines having aliphatic primary amino groups, also referred to below as primary aliphatic polyamines, and from an odorless aldehyde. The hydrolysis of the polyaldimines reforms the aforementioned aldehydes and the aforementioned polyamines.

Aldimines are substances from a class of compounds which has long been known per se, having been described, for example, in R. W. Layer, Chem. Rev. 1963, 63, 489-510. It is known that aldimines on contact with water can undergo hydrolysis to give the corresponding aldehydes and amines. In the absence of water, aldimines are extremely stable compounds. Because of this quality they are used, for example, in order to bind, and/or to protect, amines or aldehydes. Thus, as described for example in U.S. Pat. Nos. 3,420,800 and 3,567,692, aldimines are used in polyurethane chemistry, where in combination with isocyanates they produce stable, storable compositions. Within such compositions the aldimines are also referred to as "latent curing agents", since in the presence of water (in the form for example of humidity from the air) they release amines, which are able to react with the isocyanates and so lead to crosslinking.

Aldehydes generally are extremely intensely odorous substances, a fact which, for those who have close contact with such aldehydes is unpleasant and may trigger headaches, nausea or other health problems. Consequently many aldehydes, and the aldimines derived from them, are of only limited possibility for use, since it is always necessary to ensure effective ventilation or else respiratory protection must be worn.

In order to avoid such restrictions on application there is a great need for polyaldimines which are odorless and which on being hydrolyzed release aldehydes which are likewise odorless.

To the skilled worker it is clear that the term "odorless" is difficult to define. Here and throughout the document it is intended to mean "imperceptible or only slightly perceptible (smellable) to human beings possessing the sense of smell".

There have to date been a variety of attempts to reduce the odor of polyaldimines and/or of the aldehydes released in the course of their hydrolysis.

U.S. Pat. No. 6,136,942 describes one-component polyurethanes which comprise 3-phenyloxybenzaldimines of aliphatic polyamines, and similar compounds, and are said to exhibit low-odor curing. The odor of the aromatic aldehydes released when these curing agents are employed, however, is markedly perceptible and for many applications it is intolerable.

U.S. Pat. No. 4,469,831 describes the use of 2,2-dimethyl-3-(isobutyroxy)-propanealdimines of aliphatic polyamines as curing agents for one-component polyurethanes. Compositions are obtained with purportedly little odor. The aldehyde which is released when the polyaldimines described are employed, however, gives rise to a long-lasting, pungent odor, which is intolerable for many applications.

U.S. Pat. No. 4,853,454 describes, inter alia, a one-component polyurethane composition which comprises substituted 2,2-dimethylpropanealdimines of aliphatic polyamines. The aldehydes released when the polyaldimines described are hydrolyzed are said, owing to their high vapor pressure, to lead to compositions purportedly of very low odor. When the polyaldimines described are employed, however, there are, here as well, unpleasant odors, perceptible over a long period, which makes these substances likewise unsuitable for odor-sensitive applications.

U.S. Pat. No. 4,720,535 describes moisture-curing polyurethane compositions which comprise substituted 2,2-dimethylpropanealdimines of aromatic polyamines. The use of the polyaldimines described is unsuitable owing to the aromatic polyamines used. On the one hand, aromatic polyamines are generally much more toxic than their aliphatic counterparts, and on the other hand, polyaldimines of aromatic polyamines are much less reactive than those of aliphatic polyamines, both in respect of the hydrolysis of the aldimine groups and, mostly, in respect of a subsequent reaction with components that are reactive toward amines. It is known, moreover, that aromatic polyamines are discolored under the effect of light. Furthermore, the majority of the aldehydes described here likewise give rise to an odor varying from markedly perceptible to strong.

To date there are no polyaldimines of aliphatic polyamines available which are odorless and on hydrolysis release odorless aldehydes.

Problem and Solution

The problem addressed by the present invention was therefore to provide odorless polyaldimines whose aldimine groups hydrolyze rapidly on contact with water and the aldehydes released in the course of said hydrolysis do not give rise to any perceptible odor. Both the polyaldimines and their hydrolysis products should as far as possible be toxicologically unobjectionable.

Surprisingly it has been found that the aforementioned problem can be solved by means of polyaldimines as claimed in claim 1. The polyaldimines of the invention are obtainable from at least one polyamine having aliphatic primary amino groups and at least one aldehyde in accordance with the formula specified later on.

A fact surprising and not obvious to the skilled worker is that polyaldimines of this kind have a sufficiently high reactivity as curing agents for systems containing amine-reactive components. The skilled worker would have expected such polyaldimines, owing to their hydrophobic structure, to be poorly accessible for the water required for the hydrolysis of the aldimine groups, and that, consequently, their hydrolysis would proceed only slowly and incompletely. Unexpectedly, however, such polyaldimines hydrolyze quickly and completely on contact with moisture. Their reactivity is comparable with that of substantially less hydrophobic polyaldimines, as are described, for example, in U.S. Pat. No. 4,469,831.

The preparation of the aldehydes used for the polyaldimines uses readily available, inexpensive raw materials and is accomplished surprisingly simply by means of the esterification of carboxylic acids of low volatility, examples being long-chain fatty acids, with β-hydroxy aldehydes, especially 3-hydroxypivalaldehyde. Surprisingly this reaction step can be carried out without solvent. Depending on the carboxylic acid used, the resulting aldehydes are solid or liquid at room temperature. Subsequently they can be reacted effectively with polyamines to give the corresponding polyaldimines. Since the entire preparation operation can be carried out without solvent, there is no need for distillative removal of solvents, which on the one hand simplifies the preparation operation and on the other hand prevents any residues of solvent in the polyaldimine being able to give rise to a nuisance odor.

Finally it has been found that the polyaldimines of the invention are suitable for use in moisture-reactive compositions which comprise components that are reactive toward amines. These compositions are stable on storage in the absence of moisture.

SUMMARY OF THE INVENTION

The present invention relates to polyaldimines which are obtainable from at least one polyamine A having aliphatic primary amino groups and at least one aldehyde B. These polyaldimines, and also the aldehydes B formed during their hydrolysis, are odorless. Additionally disclosed are processes for preparing these polyaldimines and aldehydes B, and processes for hydrolyzing the polyaldimines.

Finally a description is given of the use of these polyaldimines in compositions as adhesive, sealant, coating or covering.

The polyaldimines of the invention are notable in that they are odorless, hydrolyze rapidly on contact with water, do not give rise to any perceptible odor during and after their hydrolysis, and are stable on storage in the absence of water in compositions which comprise components that are reactive toward amines.

DETAILED DESCRIPTION OF THE INVENTION

The present invention relates to polyaldimines which are obtainable from at least one polyamine A having aliphatic primary amino groups and at least one aldehyde B having the formula (I):

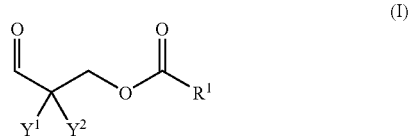

where $Y^1$ and $Y^2$ on the one hand independently of one another are an alkyl, aryl or arylalkyl group, which if desired may in each case be substituted, if desired may in each case contain heteroatoms and if desired may in each case contain unsaturated components. Preferably $Y^1=Y^2=$methyl.

On the other hand $Y^1$ and $Y^2$ can be connected to one another to form a carbocyclic or heterocyclic ring which has a ring size of between 5 and 8, preferably 6, atoms and if desired contains one or two singly unsaturated bonds.

The radical $R^1$ stands either for a linear or branched alkyl chain having 11 to 30 carbon atoms, with or without at least one heteroatom, in particular with at least one ether oxygen, or for a singly or multiply unsaturated linear or branched hydrocarbon chain having 11 to 30 carbon atoms, or for a radical of the formula (II) or (III).

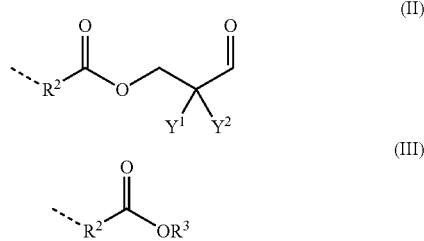

In the formulae (II) and/or (III) $R^2$ is a linear or branched or cyclic alkylene chain having 2 to 16 carbon atoms, with or without at least one heteroatom, in particular with at least one ether oxygen, or is a singly or multiply unsaturated linear or branched or cyclic hydrocarbon chain having 2 to 16 carbon atoms, and $R^3$ is a linear or branched alkyl chain having 1 to 8 carbon atoms. $Y^1$ and $Y^2$ have the definition already specified, and the dashed lines in the formulae denote the connection points. By "poly" in "polyaldimine" or "polyamine" are meant molecules which formally contain two or more of the functional groups in question. The term "polyamines having aliphatic primary amino groups" refers in the present document always to compounds which formally contain two or more $NH_2$ groups which are attached to an aliphatic, cycloaliphatic or arylaliphatic radical. They consequently differ from the aromatic amines, in which the amino groups are attached directly to an aromatic radical, such as in aniline or 2-aminopyridine, for example.

The polyaldimine is preparable from at least one polyamine A having aliphatic primary amino groups and at least one aldehyde B by a condensation reaction with the elimination of water. Condensation reactions of this kind are very well known and are described, for example, in Houben-Weyl, "Methoden der organischen Chemie", Vol. XI/2, page 73 ff. In this reaction the aldehyde B is used stoichiometrically or in a stoichiometric excess in relation to the primary amino groups of the polyamine A.

Normally such condensation reactions are carried out in the presence of a solvent which allows the water formed during the reaction to be removed azeotropically. For the preparation of the polyaldimines of the invention, however, preference is given to a preparation process without use of solvents, where the water formed during the condensation is removed from the reaction mixture directly by means of vacuum. The solvent-free preparation removes the need for distillative removal of the solvent after preparation has taken place, thereby simplifying the preparation procedure. Moreover, in this way the polyaldimine is free from solvent residues, which could at the least cause a nuisance odor.

Suitable polyamines A having aliphatic primary amino groups for preparing the polyaldimines are customary polyamines such as are used, for example, in polyurethane or epoxy chemistry. Examples that may be mentioned include the following: aliphatic polyamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentane-diamine, 1,6-hexanediamine, 2,2,4- and 2,4,4-trimethylhexamethylenediamine and mixtures thereof, 1,7-heptanediamine, 1,8-octanediamine, 4-aminomethyl-1,8-octanediamine, 1,9-nonanediamine, 1,10-decanediamine, 1,11-undecane-diamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine, cycloaliphatic polyamines such as 1,2-, 1,3- and 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)-cyclohexane, 1-cyclohexylamino-3-aminopropane, 2,5(2,6)-bis(aminomethyl)-bicyclo [2.2.1]heptane (NBDA, manufactured by Mitsui Chemicals), 3(4),8(9)-bis(aminomethyl)tricyclo[5.2.1.0$^{2,6}$]decane, 1,4-diamino-2,2,6-trimethylcyclo-hexane (TMCDA), 3,9-bis(3-aminopropyl)-2,4,8,10-tetraoxaspiro[5.5]undecane, 1,3- and 1,4-xylylenediamine, aliphatic polyamines containing ether groups, such as bis(2-aminoethyl)ether, 4,7-dioxadecane-1,10-diamine, 4,9-dioxa-dodecane-1,12-diamine and higher oligomers thereof, polyoxyalkylene-polyamines having in theory two or three amino groups, obtainable for example under the name Jeffamine® (manufactured by Huntsman Chemicals), and also mixtures of the aforementioned polyamines.

Preferred polyamines are 1,6-hexamethylenediamine, MPMD, DAMP, 2,2,4- and 2,4,4-trimethylhexamethylenediamine, 4-aminomethyl-1,8-octane-diamine, IPDA, 1,3- and 1,4-xylylenediamine, 1,3- and 1,4-bis(aminomethyl)-cyclohexane, bis(4-aminocyclohexyl)methane, bis(4-amino-3-methylcyclo-hexyl)methane, 3(4),8(9)-bis(aminomethyl)tricyclo[5.2.1.0$^{2,6}$]decane, 1,2-, 1,3- and 1,4-diaminocyclohexane, polyoxyalkylene polyamines having in theory two or three amino groups, especially Jeffamine® EDR-148, Jeffamine® D-230, Jeffamine® D-400 and Jeffamine® T-403, and, in particular, mixtures of two or more of the aforementioned polyamines.

The polyaldimine is prepared using at least one aldehyde B having the formula (I):

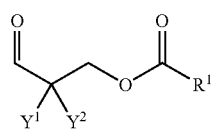
(I)

In one preferred preparation method of the aldehyde B a starting compound is a β-hydroxy aldehyde of formula (IV), which can be prepared, for example, from formaldehyde (or paraformaldehyde or oligomeric forms of formaldehyde, such as 1,3,5-trioxane) and an aldehyde of formula (V) in a crosslinked aldol addition, in situ if appropriate.

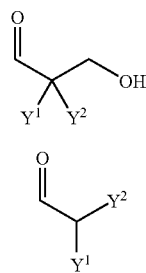
(IV)

(V)

The β-hydroxy aldehyde of formula (IV) is reacted with a carboxylic acid to give the corresponding ester, specifically either with a long-chain fatty acid $R^1$—COOH, to give the corresponding fatty acid ester, and/or with a dicarboxylic acid monoalkyl ester HOOC—$R^2$—COOR$^3$, to give the aldehyde B having the radical according to formula (III); and/or with a dicarboxylic acid HOOC—$R^2$—COOH, to give the aldehyde B, in that case a dialdehyde, having the radical according to formula (II). The formulae (II) and (III) and $R^1$, $R^2$ and $R^3$ have the definition already described. This esterification can take place without the use of solvents in accordance with known methods, described for example in Houben-Weyl, "Methoden der organischen Chemie", Vol. VIII, pages 516-528.

Normally such esterification reactions are carried out in the presence of a solvent, which after the reaction has taken place is removed again, by means of distillation for example, together where appropriate with excess alcohol which has not reacted in the esterification. In the case of one preferred process for preparing the aldehyde B, however, no solvent at all is used. In that case the β-hydroxyaldehyde according to formula (IV) is reacted, without the use of solvents, directly with the carboxylic acid or with the carboxylic acid mixture, the water formed during the esterification being removed under vacuum. Since the carboxylic acids used for the esterification are virtually odorless, traces thereof in the polyaldimines likewise do not give rise to any nuisance odor. For this reason, and on account of the solvent-free preparation, it is possible to dispense with the purification of the aldehydes, following their preparation, by means of costly and inconvenient methods, such as by rectification or crystallization, for example, and so the preparation procedure is made very much simpler.

Of course, esterification reactions using solvents are also possible; they are, however, not preferred, since they necessitate a subsequent, costly and inconvenient separation of the solvent, or else the polyaldimines, owing to solvent residues, cannot be prepared odorlessly.

In the case of the use of dicarboxylic acids a mixture of aldehydes B having the radicals according to formula (II) and according to formula (III) is obtained if, for example, first some of the carboxylic acid groups are esterified with the β-hydroxy aldehyde according to formula (IV) and subsequently the remaining carboxylic acid groups are esterified with an alkyl alcohol ($R^3$—OH). A mixture of this kind can be used directly to prepare the polyaldimine.

Preferred aldehydes according to formula (V) for reaction with formaldehyde to give β-hydroxy aldehydes according to formula (IV) are the following: isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde and diphenyl-acetaldehyde. Isobutyraldehyde is particularly preferred.

Preferred β-hydroxy aldehydes according to formula (IV) are the products from the reaction of formaldehyde with the aldehydes according to formula (V) specified in the foregoing as being preferred. 3-Hydroxypivalaldehyde is particularly preferred.

As suitable carboxylic acids for esterification with the β-hydroxy aldehydes according to formula (IV) mention may be made, for example, of the following: lauric acid, tridecanoic acid, myristic acid, pentadecanoic acid, palmitic acid, margaric acid, stearic acid, nonadecanoic acid, arachidic acid, palmitoleic acid, oleic acid, erucic acid, linoleic acid, linolenic acid, elaeostearic acid, arachidonic acid, succinic acid, glutaric acid, adipic acid, pimelic acid, suberic acid, azelaic acid, sebacic acid, 1,12-dodecanedioicc acid, maleic acid, fumaric acid, hexahydrophthalic acid, hexahydroisophthalic acid, hexahydroterephthalic acid, 3,6,9-trioxaundecanedioic acid and similar derivatives of polyethylene glycol, dehydrogenated ricinoleic acids, and also fatty acids from the industrial saponification of natural oils and fats such as, for example, rapeseed oil, sunflower oil, linseed oil, olive oil, coconut oil, oil palm kernel oil and oil palm oil.

Preference is given to lauric acid, myristic acid, palmitic acid, stearic acid, oleic acid, linoleic acid, linolenic acid, succinic acid, adipic acid, azelaic acid and sebacic acid and technical mixtures of fatty acids which comprise these acids.

The reaction of at least one polyamine A having aliphatic primary amino groups with at least one aldehyde B gives rise, for example, to polyaldimines of the schematic formulae (VI) and (VII)

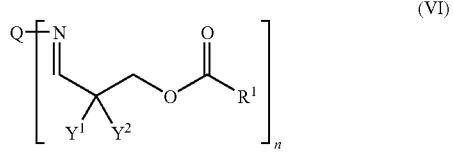

where n is 2, 3 or 4 and Q is intended to represent the radical of a polyamine A having aliphatic primary amino groups after all of the primary amino groups have been removed; and

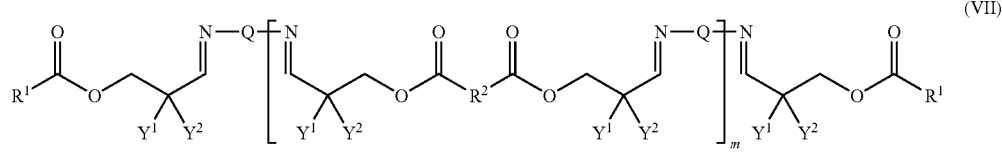

where m is an integer from 0 to 10 and Q is identical or different in the same molecule and in each case is intended to represent the radical of a polyamine A having aliphatic primary amino groups after all of the primary amino groups have been removed. The radicals $Y^1$, $Y^2$, $R^1$ and $R^2$ in the formulae (VI) and (VII) have the definition already described.

If a dialdehyde B having the radical according to formula (II) is used for preparing a polyaldimine then advantageously either it is used in a mixture with a monoaldehyde B, in a proportion such that average values for m in the range from 1 to 10 are obtained for the polyaldimine from formula (VII), or it is metered so that there is an excess of aldehyde groups in relation to the amino groups when the polyaldimine is prepared, the aldehyde excess being chosen such that average values for m likewise in the range from 1 to 10 are obtained for the polyaldimine from formula (VII). In both ways a mixture of oligomeric polyaldimines having a readily manageable viscosity is obtained.

As polyaldimine it is also possible to use mixtures of different polyaldimines, including, in particular, mixtures of different polyaldimines prepared with the aid of different polyamines A having primary aliphatic amino groups, reacted with different or identical aldehydes B, including, in particular, mixtures of polyaldimines prepared with the aid of polyamines having different numbers of primary aliphatic amino groups, i.e., different values for m.

The polyaldimines of the invention are odorless. The polyaldimines are stable on storage in the absence of moisture, alone or else in combination with components that are reacted toward amines, such as isocyanates, for example. On contact with water there is rapid hydrolysis, in the course of which aliphatic polyamines and aldehydes are liberated. Water in this case can be brought into contact in the liquid or gaseous aggregate state with the polyaldimine. Accordingly, in such a hydrolysis process, for example, water in the form of atmospheric moisture may act on the polyaldimine or on a polyaldimine-containing composition. A further example of such contacting is the incorporation by mixing of water or of a water-containing component or of a water-releasing component.

The reaction of components that are reactive toward amines with a polyaldimine which is subjected to a hydrolysis need not necessarily take place via the stage of the polyamine. Reactions are of course also possible with intermediates in the hydrolysis of the polyaldimine to the polyamine. It is conceivable, for example, for the hydrolyzing polyaldimine to react in the form of a hemiaminal directly with the components that are reactive toward amines.

The polyaldimines of the invention are used, among other things, as a source of polyamines. Polyaldimines of this kind can be used, for example, in compositions which comprise components that are reactive toward amines, such as compounds containing isocyanate groups, for example. On contact with water, polyamines are released, which react in the manner described above with the aforementioned components that are reactive toward amines and, for example, crosslink them.

The polyaldimines of the invention are particularly suitable as curing agents for use in adhesives, sealants, coatings, foams, paints and floor coverings.

The polyaldimines are especially suitable for compositions containing isocyanate groups, both in one-component systems, as moisture-reactive latent curing agents, and in two-component systems, as curing agents with retarded reaction, whose hydrolytic activation, by means of atmospheric moisture for example, which must take place before the curing reaction, allows long processing times (pot lives).

The polyaldimines of the invention are used with advantage in particular in those applications which do not permit any odor pollution by the product, before, during or after its application. The polyaldimines of the invention can of course also be used anywhere where odor does not play a critical part.

EXAMPLES

All percentage figures, unless indicated otherwise, refer to weight percentages.

Polyamines Used:

alpha,omega-Polyoxypropylenediamine (Jeffamine® D-230, Huntsman): total primary amines content≧97%; amine content=8.22 mmol $NH_2$/g.

1,3-Xylylenediamine (MXDA; Mitsubishi Gas Chemical): MXDA content≧99%; amine content=14.56 mmol $NH_2$/g.

1,6-Hexamethylenediamine (HDA): HDA content≧99.0%; amine content=17.21 mmol $NH_2$/g.

1,5-Diamino-2-methylpentane (MPMD; DuPont): MPMD content≧98.5%; amine content=17.11 mmol $NH_2$/g.

Polyols Used:

Acclaim® 4200 N (Bayer): linear polypropylene oxide polyol having a theoretical OH functionality 2, an average molecular weight of about 4000, an OH number of about 28 mg KOH/g and a degree of unsaturation of about 0.005 meq/g.

Caradol® MD34-02 (Shell): nonlinear polypropylene oxide-polyethylene oxide polyol, ethylene oxide-terminated, having a theoretical OH functionality of 3, an average molecular weight of about 4900, an OH number of about 35 mg KOH/g and a degree of unsaturation of about 0.08 meq/g.

Description of Test Methods:

The infrared spectra were measured on an FT-IR instrument 1600 from Perkin-Elmer (horizontal ATR measuring unit with ZnSe crystal); the samples were applied undiluted in the form of films. The absorption bands are given in wavenumbers ($cm^{-1}$).

The viscosity was measured at 20° C. on a cone/plate viscometer from Haake (PK100/VT-500).

The skin-forming time (time until freedom from tack, "tack-free time") was determined at 23° C. and 50% relative humidity.

Tensile strength and breaking elongation were determined on films cured for 7 days at 23° C. and 50% relative humidity in accordance with DIN EN 53504 (pulling speed: 200 mm/min).

The formation of bubbles was assessed qualitatively from the amount of bubbles which occurred in the course of curing (7 days at 23° C. and 50% relative humidity) of the films used for the mechanical tests (film thickness 2 mm).

The odor of the aldehydes or of the polyaldimines or of the compositions, respectively, was assessed by nasal odor sampling at a distance of 10 cm on the material applied as a film at room temperature. For compositions this was performed a first time on the material applied immediately beforehand and a second time 7 days thereafter on the material cured at 23° C. and 50% relative humidity.

The hydrolysis of the polyaldimines was carried out by adding the stoichiometric amount of 0.1N HCl, relative to the aldimine groups, to 10 ml of each polyaldimine and briefly mixing it in. After one hour the odor of the hydrolyzed polyaldimine was assessed by nasal odor sampling at a distance of 10 cm on the material applied as a film at room temperature.

Preparation of Polyaldimines

Polyaldimines PA1 to PA7 were prepared using aldehydes A1 to A6, whose preparation is described below:

Example 1 aldehyde A1

A round-bottomed flask with reflux condenser, thermometer and water separator (Dean Stark) was charged with 40.5 g of formaldehyde (37% in water, methanol-free), 36.0 g of isobutyraldehyde, 100.0 g of lauric acid and 1.0 g of 4-toluenesulfonic acid and placed under a nitrogen atmosphere. The mixture was heated in an oil bath at 90° C. with vigorous stirring until the reflux rate had dropped significantly. At that point the bath temperature was raised to 120° C. and the mixture was boiled at reflux to constant temperature. Then the reflux cooling was switched off and the bath temperature was raised to 140° C., at which point water began to separate. After two hours the bath temperature was raised to 170° C. and the apparatus was evacuated under a water jet vacuum for 90 minutes. A total of around 35 ml of distillate collected in the separator. The reaction mixture was cooled to room temperature and stored under a nitrogen atmosphere. The resulting product, an odorless oil of low viscosity with a bright orange color, was identified by mass spectroscopy as 2,2-dimethyl-3-oxopropyl laurate. Yield: 140 g.

IR: 2954, 2923, 2853, 2707 (CHO), 1733 (C=O), 1466, 1418, 1402, 1375, 1248, 1234, 1157, 1112, 1023, 998, 938, 892, 774, 722.

Example 2 aldehyde A2

As described for aldehyde A1, 42.8 g of formaldehyde (37% in water, methanol-free), 38.0 g of isobutyraldehyde, 150.0 g of stearic acid and 1.0 g of 4-toluenesulfonic acid were reacted with the separation of around 37 ml of water. The resulting product, an odorless material which was solid at room temperature with a bright orange color, was identified by mass spectroscopy as 2,2-dimethyl-3-oxopropyl stearate. Yield: 192 g.

IR: 2955, 2915, 2849, 2712 (CHO), 1732 (C=O), 1468, 1416, 1378, 1311, 1293, 1273, 1255, 1235, 1215, 1193, 1166, 1104, 1018, 988, 940, 892, 810, 777, 720.

Example 3 aldehyde A3

A round-bottomed flask with reflux condenser, thermometer and water separator (Dean Stark) was charged with 11.0 g of paraformaldehyde, 40.0 g of 2-methylvaleraldehyde, 64.0 g of lauric acid and 0.5 g of 4-toluenesulfonic acid and placed under a nitrogen atmosphere. The mixture was heated in an oil bath at 100° C. with vigorous stirring until the reflux rate had dropped significantly. Then the reflux cooling was switched off and the bath temperature was raised to 130° C., at which point water began to separate. After 30 minutes the bath temperature was raised to 170° C. and the apparatus was evacuated under a water jet vacuum for 90 minutes. A total of around 14 ml of distillate collected in the separator. The reaction mixture was subsequently rectified under a high vacuum. The resulting product, a colorless and odorless oil of low viscosity (boiling point 143° C. at 0.1 mbar), was identified by mass spectroscopy as 2-methyl-2-propyl-3-oxopropyl laurate. Yield: 70.0 g.

IR: 2956, 2923, 2852, 2706 (CHO), 1734 (C=O), 1466, 1417, 1398, 1378, 1347, 1233, 1156, 1112, 1074, 1011, 975, 934, 919, 885, 856, 777, 739, 722.

Example 4 aldehyde mixture A4

As described for aldehyde A1, 60.2 g of formaldehyde (37% in water, methanol-free), 53.5 g of isobutyraldehyde, 100.0 g of sebacic acid and 1.0 g of 4-toluenesulfonic acid were reacted with the separation of around 52 ml of water. The reaction mixture obtained was cooled to 100° C., admixed with 19.0 g of n-butanol, and stirred at 100° C. for 30 minutes and then the bath temperature was raised again to 140° C., whereupon water began to separate again. After one hour the bath temperature was raised to 170° C. and the apparatus was evacuated under a water jet vacuum for 90 minutes. A total of around 57 ml (52 ml+5 ml) of distillate collected in the separator. The resulting product, an odorless oil bright orange in color, consisted of a mixture of bis(2,2-dimethyl-3-oxopropyl)sebacate, butyl(2,2-dimethyl-3-oxopropyl)sebacate and dibutyl sebacate (identified by means of GC-MS). Yield: 168 g.

IR: 2933, 2855, 2708 (CHO), 1731 (C=O), 1465, 1369, 1240, 1161, 1099, 1026, 937, 893, 774, 726.

Example 5 aldehyde mixture A5

As described for aldehyde A1, 22.3 g of paraformaldehyde, 53.5 g of isobutyraldehyde, 49.5 g of lauric acid, 50.0 g of sebacic acid and 1.0 g of 4-toluenesulfonic acid were reacted with the separation of just under 14 ml of water. The resulting product, an odorless oil bright orange in color, consisted of a mixture of 2,2-dimethyl-3-oxopropyl laurate and bis(2,2-dimethyl-3-oxopropyl) sebacate (identified by means of GC-MS). Yield: 161 g.

Example 6 aldehyde A6

A round-bottomed flask with thermometer and water separator (Dean Stark) was charged with 51.0 g of 3-hydroxypivalaldehyde (dimeric form), 100.0 g of lauric acid and 1.0 g of 4-toluenesulfonic acid and placed under a nitrogen atmosphere. The mixture was heated in an oil bath to 140° C. with vigorous stirring, whereupon water began to separate. After two hours the bath temperature was raised to 170° C. and the apparatus was evacuated under a water jet vacuum for 90 minutes. A good 9 ml of distillate in all collected in the separator. The reaction mixture was then cooled to room temperature and stored under a nitrogen atmosphere. The resulting product, an odorless oil of low viscosity with a bright orange color was identified by mass spectroscopy as 2,2-dimethyl-3-oxopropyl laurate and was no different from aldehyde A1 from example 1. Yield: 141 g.

Example 7 polyaldimine PA1

A round-bottomed flask was charged with 140.0 g of aldehyde A1 and placed under a nitrogen atmosphere and the flask was cooled by means of a water bath. With vigorous stirring and continued cooling, 48.6 g of Jeffamine® D 230 were added from a dropping funnel at such a slow rate that the temperature of the mixture did not climb above 40° C. Thereafter the volatile constituents were distilled off completely under a water jet vacuum at 80° C. The resulting reaction product, liquid at room temperature, was completely odorless and had an aldimine content, determined as the amine content, of 2.17 mmol $NH_2$/g and a viscosity at 20° C. of 700 mPa·s.

IR: 2956, 2923, 2853, 1738 (C=O), 1667 (C=N), 1466, 1375, 1344, 1250, 1236, 1155, 1109, 1023, 1006, 932, 873, 722.

Example 8 polyaldimine PA2

As described for polyaldimine PA1, 192.0 g of aldehyde A2 were reacted with 57.0 g of Jeffamineo D-230. Removal of the volatile constituents at 80° C. under a water jet vacuum gave a reaction product of creamy consistency at room temperature that was completely odorless and had an aldimine content, determined as the amine content, of 1.93 mmol $NH_2$/g.

IR: 2956, 2919, 2851, 1739 (C=O), 1667 (C=N), 1467, 1396, 1375, 1247, 1157, 1111, 1021, 1003, 932, 873, 721.

Example 9 polyaldimine PA3

As described for polyaldimine PA1, 30.0 g of aldehyde A3 were reacted with 7.6 g of HDA. Removal of the volatile constituents at 80° C. under a water jet vacuum gave a colorless reaction product which was liquid at room temperature, was completely odorless and had an aldimine content, determined as the amine content, of 2.72 mmol $NH_2$/g.

IR: 2955, 2922, 2852, 1737 (C=O), 1667 (C=N), 1466, 1419, 1376, 1343, 1233, 1162, 1112, 1070, 1021, 1008, 939, 885, 863, 740, 722.

Example 10 polyaldimine PA4

As described for polyaldimine PA1, 168.0 g of aldehyde mixture A4 were reacted with 72.0 g of Jeffamine® D-230. Removal of the volatile constituents at 80° C. under a water jet vacuum gave a reaction product which was liquid at room temperature, was completely odorless and had an aldimine content, determined as the amine content, of 2.49 mmol $NH_2$/g and a viscosity at 20° C. of 6700 mPa·s.

IR: 2964, 2928, 2855, 1734 (C=O), 1667 (C=N), 1458, 1374, 1243, 1160, 1106, 1020, 934, 874, 726.

Example 11 polyaldimine PA5

As described for polyaldimine PA1, 140.0 g of aldehyde A1 were reacted with 26.0 g of MXDA. Removal of the volatile constituents at 80° C. under a water jet vacuum gave a reaction product which was liquid at room temperature, was completely odorless and had an aldimine content, determined as the amine content, of 2.33 mmol $NH_2$/g.

IR: 2954, 2922, 2853, 1737 (C=O), 1668 (C=N), 1608, 1466, 1395, 1374, 1367, 1302, 1249, 1232, 1158, 1113, 1020, 1006, 920, 781, 744, 722, 701.

Example 12 polyaldimine PA6

As described for polyaldimine PA1, 161.0 g of aldehyde mixture A5 were reacted with 33.0 g of MPMD. Removal of the volatile constituents at 80° C. under a water jet vacuum gave a reaction product which was liquid at room temperature, was completely odorless and had an aldimine content, determined as the amine content, of 3.05 mmol $NH_2$/g and a viscosity at 20° C. of 13 000 mPa·s.

Example 13 polyaldimine PA7

As described for polyaldimine PA1, 141.0 g of aldehyde A6 were reacted with 23.2 g of HDA. Removal of the volatile constituents at 80° C. under a water jet vacuum gave a reaction product which was liquid at room temperature, was completely odorless and had an aldimine content, determined as the amine content, of 2.50 mmol $NH_2/g$.

IR: 2954, 2923, 2853, 1737 (C═O), 1669 (C═N), 1466, 1395, 1374, 1248, 1230, 1157, 1112, 1020, 1004, 933, 722.

Example 14 polyaldimine PA8 (comparative)

A round-bottomed flask was charged with 100.0 g of Jeffamine® D-230. With effective cooling and vigorous stirring, 75.0 g of isobutyraldehyde were added from a dropping funnel. After 12 hours' stirring the volatile constituents were distilled off. The resulting reaction product, liquid at room temperature, had a very strong aldehyde odor and had an aldimine content, determined as the amine content, of 5.66 mmol $NH_2/g$.

Example 15 polyaldimine PA9 (comparative)

A round-bottomed flask was charged with 62.0 g of Jeffamine® D-230. With effective cooling and vigorous stirring, 89.5 g of 2,2-dimethyl-3-iso-butyroxypropanal were added from a dropping funnel. After 10 minutes' stirring the volatile constituents were distilled off. The resulting reaction product, liquid at room temperature, had a strong aldehyde odor and had an aldimine content, determined as the amine content, of 3.58 mmol $NH_2/g$.

Example 16 polyaldimine PA10 (comparative)

As described for polyaldimine PA9, 45.0 g of MXDA were reacted with 115.0 g of 2,2-dimethyl-3-isobutyroxypropanal. The resulting reaction product, liquid at room temperature, had a strong aldehyde odor and had an aldimine content, determined as the amine content, of 4.43 mmol $NH_2/g$.

Results: Properties of the polyaldimines

Table 1 shows how strongly any odor of the polyaldimines described is perceptible, on the one hand on smelling the product prepared ("odor after preparation") and on the other hand in the course of hydrolysis, in other words on release of the respective aldehyde ("odor after hydrolysis").

The polyaldimines PA1 to PA7 of the invention have no odor, either before or after hydrolysis. The comparative polyaldimines PA8 to PA10, in contrast, all smell strongly or very strongly, not only PA8, which releases isobutyraldehyde, but also PA9 and PA10, which were both prepared according to U.S. Pat. No. 4,469,831 and release 2,2-dimethyl-3-isobutyroxypropanal.

Examples of Use of the Polyaldimines

Examples that may be given of the possible use of the polyaldimines of the invention include, below, their use in compositions containing isocyanate groups.

Compositions Z1 to Z11 were prepared using polyurethane prepolymers PP1 and PP2, whose preparation is described below:

Polyurethane Prepolymer PP1

259 g of polyol Acclaim® 4200 N, 517 g of polyol Caradol® MD34-02, 124 g of 4,4'-methylenediphenyl diisocyanate (MDI; Desmodur® 44 MC L, Bayer) and 100 g of diisodecyl phthalate were reacted by a known method at 80° C. to give an NCO-terminated polyurethane prepolymer. The reaction product had a titrimetrically determined free isocyanate group content of 2.30%, based on the polyurethane prepolymer, and a viscosity at 20° C. of 56 Pa·s.

Polyurethane Prepolymer PP2

845 g of polyol Acclaim® 4200 N and 115 g of 4,4'-methylenediphenyl diisocyanate (MDI; Desmodur® 44 MC L, Bayer) were reacted by a known method at 80° C. to give an NCO-terminated polyurethane prepolymer. The reaction product had a titrimetrically determined free isocyanate group content of 1.96% and a viscosity at 20° C. of 37 Pa·s.

Example 17

PU compositions Z1 to Z7

The polyurethane prepolymers and polyaldimines listed in table 2 were mixed homogeneously in the stated $NH_2/NCO$ ratio (i.e., equivalents of aldimine groups per equivalents of isocyanate groups of the polyurethane prepolymer). Benzoic acid (200 mg/100 g of polyurethane prepolymer) was added to each mixture, which was again mixed homogeneously and dispensed immediately into airtight tubes, which were stored at 60° C. for 15 hours. Then a portion of each mixture was poured into a PTFE-coated metal sheet (film thickness about 2 mm) and cured for 7 days at 23° C. and 50% relative humidity, after which the mechanical properties of the through-cured film were measured. The remaining contents of the tube were used to determine the storage stability, by measurement of the viscosity before and after storage for 7 days at 60° C. The results of the tests are set out in table 2.

TABLE 1

Odor of the polyaldimines.

| | Polyaldimine | | | | | | | | | |
|---|---|---|---|---|---|---|---|---|---|---|
| | PA1 | PA2 | PA3 | PA4 | PA5 | PA6 | PA7 | PA8 Ref.* | PA9 Ref.* | PA10 Ref.* |
| Odor after preparation | none | none | none | none | none | none | none | very strong | strong | strong |
| Odor after hydrolysis | none | none | none | none | none | none | none | very strong | strong | strong |

*Ref. = comparative

TABLE 2

Polyurethane compositions with the polyaldimines of the invention.

| | PU composition | | | | | | |
|---|---|---|---|---|---|---|---|
| | Z1 | Z2 | Z3 | Z4 | Z5 | Z6 | Z7 |
| Polyurethane prepolymer | PP1 | PP1 | PP1 | PP1 | PP2 | PP2 | PP1 |
| Polyaldimine | PA1 | PA2 | PA3 | PA4 | PA5 | PA6 | PA7 |
| NH$_2$/NCO ratio | 0.5/1 | 0.5/1 | 0.5/1 | 0.5/1 | 0.7/1 | 0.7/1 | 0.5/1 |
| Viscosity before storage (Pa·s) | 50 | 66 | 55 | 70 | 32 | 36 | 48 |
| Viscosity after storage (Pa·s) | 59 | 79 | 58 | 81 | 37 | 43 | 57 |
| Skin-forming time (min.) | 35 | 38 | 32 | 45 | 40 | 50 | 35 |
| Formation of bubbles | none | none | none | none | none | none | none |
| Tensile strength (MPa) | 1.3 | 1.2 | 2.0 | 1.1 | 9.1 | 3.0* | 1.4 |
| Breaking elongation (%) | 150 | 160 | 160 | 130 | 1300 | >1300 | 150 |
| Odor on application | none | none | none | none | none | none | none |
| Odor after 7 days | none | none | none | none | none | none | none |

*Value at max. elongation (1300%)

The results of table 2 show that compositions Z1 to Z7, which contain the polyaldimines PA1 to PA7 of the invention, are all stable on storage, have good reactivity (skin-forming time) and cure without bubbles. In the cured state they possess good mechanical properties and neither during application nor later give off a nuisance odor.

Example 18

PU compositions Z8 to Z11 (comparative)

Example 18 (comparative) was carried out in the same way as for example 17 but using the polyaldimines PA8 to PA10 prepared in accordance with the prior art. The results of the tests are set out in table 3.

TABLE 3

Polyurethane compositions prepared in accordance with the prior art.

| PU compositions | Z8 comparative | Z9 comparative | Z10 comparative | Z11 comparative |
|---|---|---|---|---|
| Polyurethane prepolymer | PP1 | PP1 | PP2 | PP1 |
| Polyaldimine | PA8 | PA9 | PA10 | — |
| NH$_2$/NCO ratio | 0.5/1.0 | 0.5/1.0 | 0.7/1.0 | — |
| Viscosity before storage (Pa·s) | — (gelled) | 48 | 34 | 56 |
| Viscosity after storage (Pa·s) | — (gelled) | 58 | 38 | 61 |
| Skin-forming time (min.) | 25 | 29 | 40 | >600 |
| Formation of bubbles | none | none | none | very severe |

TABLE 3-continued

Polyurethane compositions prepared in accordance with the prior art.

| PU compositions | Z8 comparative | Z9 comparative | Z10 comparative | Z11 comparative |
|---|---|---|---|---|
| Tensile strength (MPa) | n.m. | 1.2 | 7.5 | n.m. |
| Breaking elongation (%) | n.m. | 150 | 1300 | n.m. |
| Odor on application | very strong | strong | strong | none |
| Odor after 7 days | slight | strong | strong | none |

(n.m. = not measurable)

The results of table 3 show that the polyurethane composition Z8, containing the polyaldimine PA8, is not stable on storage. The mixture had gelled even before the first viscosity measurement. Moreover, on application, Z8 has a very strong odor.

The polyurethane compositions Z9 and Z10, formulated in accordance with U.S. Pat. No. 4,469,831, do have good storage stability and reactivity and in the cured state possess good mechanical properties; the aldehyde released in the course of hydrolysis, however, gives rise to a strong and long-lasting odor, which is unacceptable for many applications.

Polyurethane composition Z11, which contains no latent curing agent, is indeed odorless and also stable on storage; the reactivity, however, is low (very long skin-forming time), and curing is accompanied by the formation of a large number of bubbles, so that the effective mechanical properties of the cured composition were impossible to determine.

The invention claimed is:
1. A polyaldimine which is obtainable from
at least one polyamine A having aliphatic primary amino groups and
at least one aldehyde B of the formula

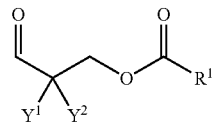

where $Y^1$ and $Y^2$ either independently of one another are an alkyl, aryl, arylalkyl group, a substituted alkyl, a substituted aryl, an alkyl containing one or more heteroatoms, an aryl containing one or more heteroatoms, a substituted alkyl containing one or more heteroatoms, or a substituted aryl containing one or more heteroatoms;
or $Y^1$ and $Y^2$ are connected to one another to form a carbocyclic or heterocyclic ring which has a ring size of between 5 and 8 atoms; and
$R^1$ stands either
for a linear or branched alkyl chain having 11 to 30 carbon atoms, with or without at least one heteroatom,
or for a singly or multiply unsaturated linear or branched hydrocarbon chain having 11 to 30 carbon atoms;

or for

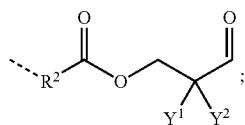

or for

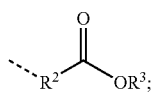

where $R^2$ is a linear or branched or cyclic alkylene chain having 2 to 16 carbon atoms, with or without at least one heteroatom, or is a singly or multiply unsaturated linear or branched or cyclic hydrocarbon chain having 2 to 16 carbon atoms, and $R^3$ is a linear or branched alkyl chain having 1 to 8 carbon atoms;

wherein the polyaldimine is odorless.

2. The polyaldimine as claimed in claim 1, wherein the polyamine A having aliphatic primary amino groups is selected from the group consisting of 1,6-hexamethylenediamine, 1,5-diamino-2-methylpentane (MPVD), 1,3-diaminopentane (DAMP), isophoronediamine (IPDA), 2,2,4- and 2,4,4-trimethyihexamethylenediamine, 4-aminomethyl- 1,8-octanediamine, 1,3- and 1,4-xylylenediamine, 1,3- and 1,4-bis(aminomethyl)cyclohexane, bis(4-aminocyclohexyl)methane, bis(4-amino-3-methylcyclohexyl)methane, 3 (4),8 (9)-bis(aminomethyl)tricyclo[5.2.1.0$^{2,6}$]decane, 1,2-, 1,3- and 1,4-diaminocyclohexane, polyoxyalkylene polyamines having in theory two or three amino groups, and also mixtures of two or more of the aforementioned polyamines.

3. The polyaldimine as claimed in claim 1, wherein the aldehyde B used for preparing the polyaldimine is obtainable by means of an esterification reaction of a β-hydroxy aldehyde with a carboxylic acid, the β-hydroxy aldehyde being prepared, in situ if appropriate, from formaldehyde, and/or paraformaldehyde, and from a second aldehyde, this second aldehyde being selected from the group consisting of isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3-phenylpropionaldehyde, 2-phenylpropionaldehyde and diphenylacetaldehyde.

4. The polyaldimine as claimed in claim 3, wherein the carboxylic acid used for preparing the aldehyde B is selected from the group consisting of lauric acid, myristic acid, palmitic acid, stearic acid, oleic acid, linoleic acid, linolenic acid, succinic acid, adipic acid, azelaic acid and sebacic acid.

5. The polyaldimine as claimed in claim 1, wherein the aldehyde B is present stoichiometrically or in a stoichiometric excess in relation to the primary amino groups of the polyamine A.

6. The polyaldimine as claimed in claim 1, wherein $Y^1=Y^2$=methyl.

7. A process for preparing a polyaldimine as claimed in claim 1, comprising reacting an aldehyde B with a polyamine A having aliphatic primary amino groups.

8. The process for preparing a polyaldimine as claimed in claim 7, further comprising a step of preparing an aldehyde B from a carboxylic acid and a β-hydroxy aldehyde, the β-hydroxy aldehyde being prepared from formaldehyde, and/or paraformaldehyde or oligomeric forms of formaldehyde, and from a second aldehyde.

9. The process for preparing a polyaldimine as claimed in claim 7, further comprising a step of preparing an aldehyde B from a carboxylic acid and 3-hydroxypivalaldehyde, 3-hydroxypivalaldehyde being prepared from formaldehyde, and/or paraformaldehyde, and from isobutyraldehyde.

10. The process for preparing a polyaldimine as claimed in claim 7, wherein no solvents are used during the preparation of the polyaldimine and/or of the aldehyde.

11. A process for hydrolysis of a polyaldimine as claimed in claim 1 comprising bringing the polyaldimine into contact with water in the gaseous aggregate state whereby aldehyde B is released.

12. A hydrolysis process characterized in that a polyaldimine as claimed in claim 1 is brought into contact with water in the form of a water-containing component or a water-releasing component, and aldehyde B is released.

13. The hydrolysis process as claimed in claim 11, wherein the polyaldimine is present in a composition which comprises components that are reactive toward amines.

14. The polyaldimine as claimed in claim 1, characterized in that $R^1$ in the aldehyde B is a linear or branched alkyl chain having 17 to 30 carbon atoms.

* * * * *